United States Patent [19]
Bolanos

[11] Patent Number: 5,939,873
[45] Date of Patent: Aug. 17, 1999

[54] TEST FIXTURE FOR A LIQUID RECIRCULATION UNIT

[75] Inventor: Robert E. Bolanos, San Antonio, Tex.

[73] Assignees: Sony Corporation, Tokyo, Japan; Sony Electronics Inc., Park Ridge, N.J.

[21] Appl. No.: 08/969,843

[22] Filed: Nov. 13, 1997

[51] Int. Cl.$^6$ .............................. G01R 19/00; G01R 31/02
[52] U.S. Cl. .......................... 324/66; 324/133; 324/555; 340/517
[58] Field of Search ...................................... 324/503, 504, 324/511, 555, 556, 66, 133; 340/500, 514, 515, 517, 635, 640, 641, 642, 643, 644, 645, 646, 647, 648; 374/4, 5, 100, 145, 147

[56] References Cited

U.S. PATENT DOCUMENTS

| | | | |
|---|---|---|---|
| 2,858,507 | 10/1958 | Liautau et al. | 324/511 |
| 4,547,722 | 10/1985 | Sarlo | 324/504 |
| 5,428,294 | 6/1995 | Teel, Jr. | 324/556 |
| 5,446,389 | 8/1995 | Lenz | 324/555 |
| 5,505,544 | 4/1996 | Hunt . | |
| 5,557,417 | 9/1996 | Ishii . | |

*Primary Examiner*—Diep Do
*Attorney, Agent, or Firm*—Wood, Herron & Evans, L.L.P.

[57] ABSTRACT

A test fixture for testing the operation of a device having components installed at a first location. The components are connected to associated apparatus installed at a separate second location, and the components collectively have electrical inputs and outputs connected to a control at the second location. The test fixture has a housing and a plurality of output conductors at the first location. First ends of selected ones of the plurality of output conductors are connectable to selected ones of the inputs and outputs of the components. A power supply and a plurality of switches are mounted to the housing. Each of the plurality of switches has one contact connected to the power supply and another contact connected to a second end of respective one of the plurality of output conductors, whereby actuating one of the switches causes a respective one of the components to operate.

12 Claims, 2 Drawing Sheets

TEST FIXTURE FOR A LIQUID RECIRCULATION UNIT

FIELD OF THE INVENTION

This invention relates generally to the field of test fixtures and, more particularly, to an improved test fixture apparatus for independently checking the operation of different devices normally functioning together in a unit.

BACKGROUND OF THE INVENTION

Current manufacturing processes are very complex and the environments housing those processes are also elaborate. For example, it is common for a process to be set up in a one room or area, and the equipment supporting that process located in another physical area, for example, in an adjacent room, on floor or level below the process room, or even in a separate building. There are many advantages in separating the process from the equipment, for example, many processes are required to be conducted in a clean, if not sterile environment. However, the equipment supporting the process, for example, motors, pumps, valves, heating and cooling equipment, storage tanks, etc, is generally large, noisy and often physically dirty. Separating the equipment from the process generally only requires running more pipes and wires between an equipment control and process interface equipment at the process location and the location of the equipment supporting the process.

One disadvantage of separating the process and control from the supporting equipment is in troubleshooting and diagnosing problems. If a problem arises, the control operating the equipment and the equipment itself are in two different and separate locations; and therefore, at least two persons, one at each location and in radio or telephonic contact, are required to diagnose the situation. For example, one person operates the system control at the process location, while the other person observes the response at the equipment location. Further, even with those two people, it is still difficult to isolate control problems from equipment problems. In other words, if a device is not working, it is difficult to determine whether the device itself is not functioning or whether the process control is at fault by not properly commanding the device to operate.

Thus, there is a need to provide a system that provides an improved ability to isolate control related and equipment related problems in a manufacturing environment.

SUMMARY OF THE INVENTION

The present invention provides a test fixture that is relatively inexpensive, portable, easily connected and improves the efficiency with which the problems in equipment can be isolated and diagnosed. Therefore, the test fixture of the present invention is especially useful in those environments in which equipment supporting a process is installed at a different physical location from the location of the equipment control and the process.

In accordance with the principles of the present invention and in accordance with the described embodiments, a test fixture is provided for testing the operation of a device having components installed at a first location. The components are connected to associated apparatus installed at a separate second location, and the components collectively have electrical inputs and outputs connected to a control at the second location. The test fixture has a housing and a plurality of output conductors at the first location. First ends of selected ones of the plurality of output conductors are connectable to selected ones of the inputs and outputs of the components. A power supply and a plurality of switches are mounted to the housing. Each of the plurality of switches has one contact connected to the power supply and another contact connected to a second end of respective one of the plurality of output conductors, whereby actuating one of the switches causes a respective one of the components to operate.

In one aspect of the invention, the components at the first location are wired to a first connector, and the control at the second location has a cable terminated with a second connector connectable to the first connector. The test fixture further comprises a third connector connectable to the first connector, the third connector being attached to the first ends of the plurality of conductors.

In a further aspect of the invention, one of the switches is a single-pole, double-throw switch and another of the switches is a pushbutton switch. In a still further aspect of the invention, one of the components is a resistance device and fixture includes an indicator providing a visually perceptible output as a function of the operation of the resistance device.

In another embodiment of the invention, a method of using the above-described test fixture is provided by disconnecting the first and second connectors to disconnect the components from the associated equipment and connecting the first and third connectors to connect the components to the test fixture. The method further calls for selectively activating a switch to selectively operate one of the components and activating the indicator in response to the operation of the one of the components.

These and other objects and advantages of the present invention will become more readily apparent during the following detailed description together with the drawings herein.

DETAILED DESCRIPTION OF THE INVENTION

Figure 1:
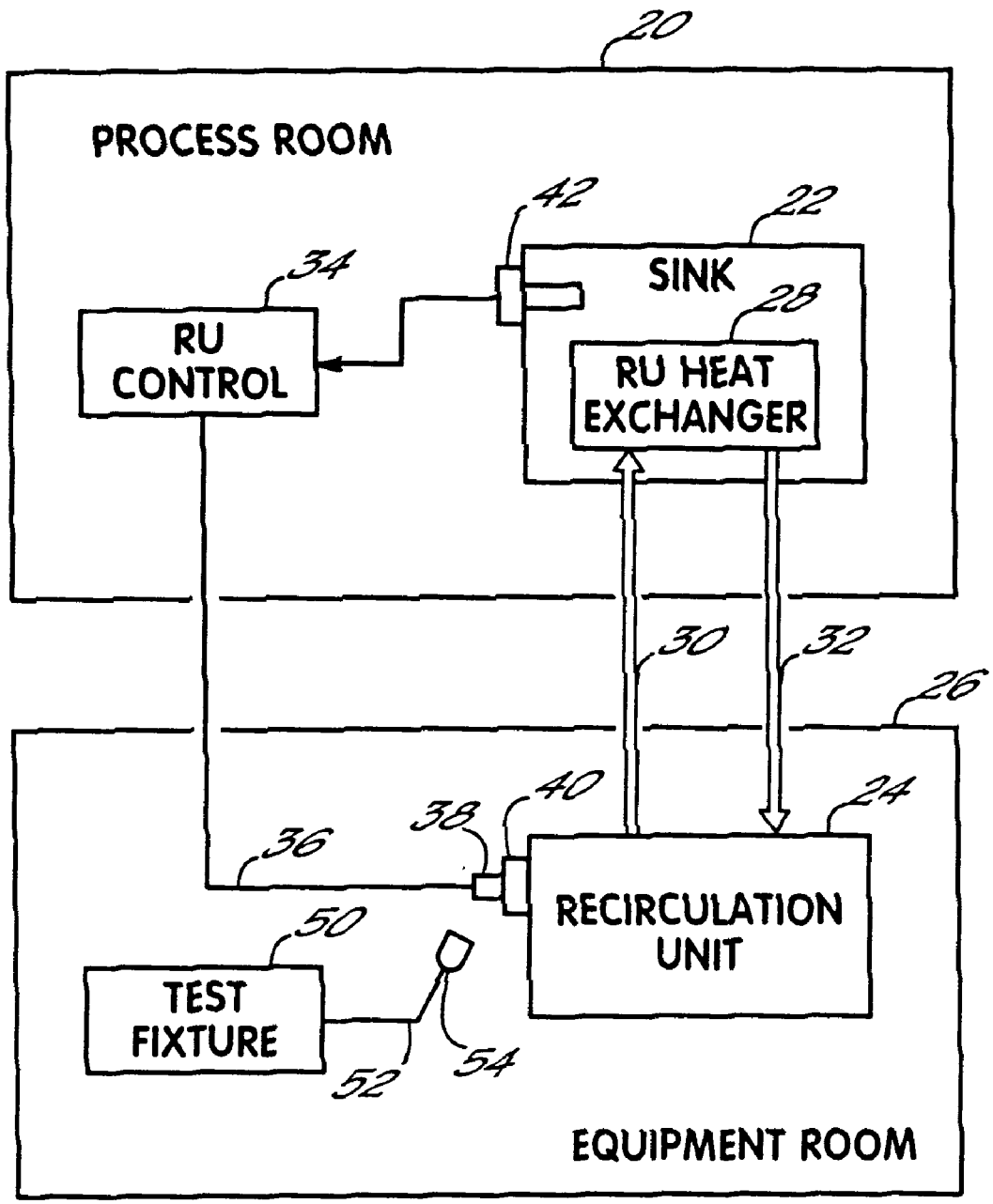
FIG. 1 is a schematic block diagram of the general environment of the invention in accordance with the principles of the present invention.

Referring to FIG. 1, a process room at 20 identifies a location where a process is being executed. For purposes of the invention, the specific process being executed is exemplary only and not a limitation on the claimed invention. Assume for example that printed circuit boards are being manufactured in the process room and one step of the manufacturing process is to pass the boards through an acid bath in a sink 22 of a wet bench. Normally, the acid in the bath is preferably maintained at a fixed, set point temperature, for example, 25° C. In order to maintain that temperature, a recirculation unit 24 is located in an equipment room 26 at a different location physically separated from the process room 20. For example, the equipment room 26 may be located on a floor or level immediately below the process room. In that example, a recirculation unit heat exchanger 28 is mounted within the sink 22 containing the acid bath and is connected to recirculation by inlet and outlet pipes 30, 32 respectively. A recirculation unit control 34 is also normally located in the process room 20 and is connected to the recirculation unit 24 by a connector 38 on the end of cabling 36 which is coupled to a wetting connector 40 mounted on a control plate (not shown) of the recirculation unit. The recirculation unit 24 is also connected to a source of power in a known manner. A heat exchange fluid, for example, ethanol glycol, is circulated within the heat exchanger 28, pipes 30, 32 and the recirculation unit 24, A temperature probe 38, for example, a resistance temperature device ("RTD") senses the temperature of the acid in the sink 22 and provides a signal representing the acid temperature to the RU control 34. The RU control 34 then provides via cabling 36, command signals to the recirculation unit 24 to operate either a heater or a cooling unit such that the temperature of the heat exchange fluid circulating between the heat exchanger 28 and recirculation unit 24 is maintained at the set point temperature.

In the event that the acid bath in sink 22 deviates from the set point temperature, it is then necessary to determine the precise fault, that is, the device which has failed and caused the temperature to rise. As will be appreciated, it is almost impossible for a single person to perform such a diagnosis. Generally, one person is located in the control room and in telephonic communication with another person located in the equipment room. Normally, the first person operates the recirculating unit control 34 to provide specific command signals to the recirculation unit 24. The responses to those command signals are checked by the second person in the equipment room. Another problem arises because the commands issued by the recirculation unit control 34 are not always the commands that are desirable for diagnostic purposes.

To expedite and simplify the diagnostic process, the present invention provides a test fixture 50 which is contained within a portable housing 51 that is located in the equipment room at 26. The test fixture has a cable 52 and a connector 54 that is identical to the connector 38 of the control unit. To utilize the test fixture 50, the connector 38 of the control unit 34 is removed from connector 40, and the connector 54 is coupled to the connector 40 of the recirculation unit 24. The test fixture 50 is then connected into a source of power, for example, 110 VAC.

Figure 2:
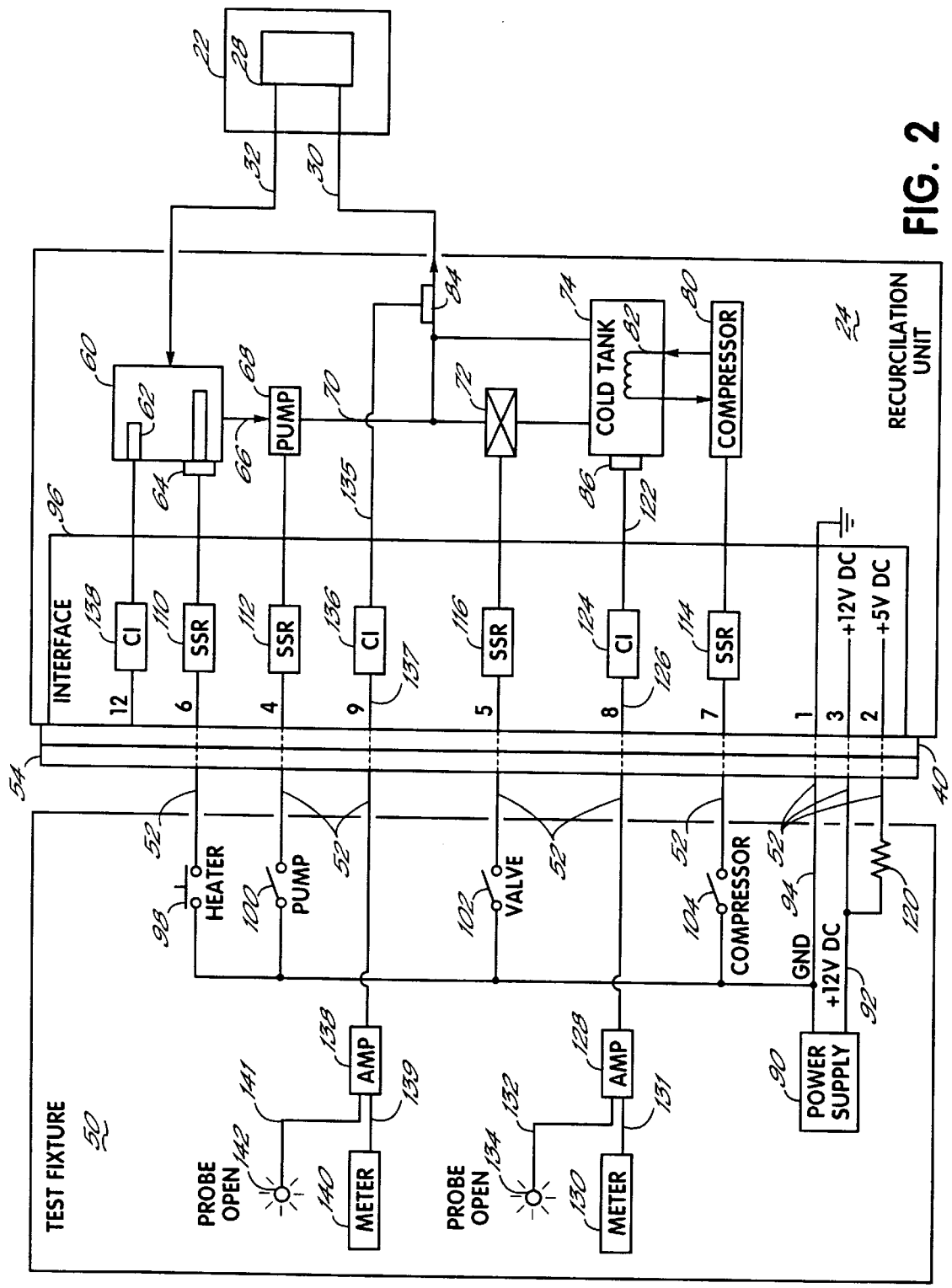
FIG. 2 is a schematic block diagram of a test fixture in accordance with the principles of the present invention.

Referring to FIG. 2, the recirculation unit 24 has a recirculation tank with an inlet connected to the outlet line 32 for receiving the heat exchange fluid from the heat exchanger 28. The tank 60 includes a low-level switch 62 and a heater 64. An outlet from the tank is connected by a fluid line 66 to an inlet of a pump 68. A pump outlet fluid line 70 is connected to a cold valve 72 which in turn is connected to an inlet of a cold tank 74. The outlet of the cold tank is connected in common with the outlet fluid line 70 from the pump 68, both of which are connected to the inlet line 30 to the heat exchanger 28.

Normally, if the heat exchange liquid is circulated from the heat exchanger 28 through its outlet line 32, the recirculation tank 60, the pump 66 and the heat exchange inlet line 30. If the heat exchange liquid is to be cooled, the cold valve 72 is opened, thus pumping a portion of the liquid through the valve 72, the cold tank 74 and then to the inlet 30 of the heat exchanger 28. In a known manner, a refrigerant is recirculated from a compressor 80 through a heat exchanger 82 within the cold tank 74. During normal operation, the recirculation unit control 34 (FIG. 1) receives input signals from the temperature probe 42 within the sink 22, the low-level switch 62 within the recirculation tank 60, the recirculation sensor 84 and the temperature sensor 86 within the cold tank 74. In response to those input signals, the recirculation unit control 34 operates the heater 64, pump 68, valve 72 and compressor 80. In the event the recirculation unit control 34 is unable to maintain the temperature of the liquid in the sink 22 within the desired temperature limits, an alarm is provided to the operator. As previously described, the diagnosis of a fault is more difficult because of the different physical locations of the recirculation unit control 34 and the recirculation unit 24.

The present invention provides a device, that is, test fixture 50 which permits the operator to easily and quickly isolate of the mechanical equipment from the recirculation unit control 34 and thereafter, diagnose faults in the mechanical equipment. The test fixture 50 contains a number of components that allow a diagnostician to simulate outputs from the recirculation unit controller 34. The test fixture 50 has a power supply 90 mounted within the housing 51 that produces +12 volts DC on output 92 and zero volts or ground on an output 94. The logic of an interface circuit 96 within the recirculation unit 24 requires that, to turn a device ON, the input to the interface 96 must be switched to ground. A heater switch 98, a pump switch 100, a valve switch 102 and a compressor switch 104 are mounted to the housing 51, and the ground output 94 of the power supply 90 is connected to one side or contact of each of the switches 98, 100, 102, 104. The switches 100, 102, 104 are normally a single-pole, double-throw switch and the switch 98 is normally a pushbutton switch. The other side or contact of each of the switches 98, 100, 102, 104 is connected to a respective input of the interface 96.

Therefore, by actuating the heater switch 98, a ground input is provided to the input of a solid state relay 110 that functions to turn the heater 64 ON. Deactivating the switch 98 will turn the heater 64 OFF. Similarly, moving either, the pump switch 100 or the compressor switch 1 04- to its ON position will provide a ground input to respective solid state relays 112, 114 which will function to switch the respective pump 68 and compressor 80 ON. Moving the switches 100, 104 to their OFF positions will switch the pump 68 and compressor 80 OFF. Activating the valve switch 104 will cause the solid state relay 116 to open the valve 72 and, deactivating the valve switch 102 will cause the valve 72 to close. Thus, from a location immediately adjacent the recirculation unit 24 in the equipment room 26, the diagnostician can selectively operate the heater 64, pump 68, valve 72 or compressor 80 and directly observe or otherwise detect their operation. In addition to supplying the desired logic level to the switches 98, 100, 102, 104, the power supply 90 provides a ground input, a +12 VDC input and +5 VDC input to the recirculation unit 24 to simulate power that would otherwise be provided by the recirculation unit control 34. The +5 VDC output from the test fixture is provided by a dropping resistor 120 in the known manner.

In addition to being able to individually cycle the heater 64, pump 68 and compressor 80 ON and OFF, the test fixture 50 includes circuitry for monitoring the outputs of the recirculation temperature sensor 84 and the cold tank temperature sensor 86. An output 122 from the cold tank temperature sensor 86 is conditioned by a control interface 124 that provides electrical isolation between its input and output in a known manner. The output 126 from the control interface 124 is connected to the cabling 52 and input to an instrumentation chip amplifier 128. There are numerous amplifiers that may be used for this purpose, for example, part no. LF157/NS commercially available from National Semiconductor of Santa Clara, Calif. An output 131 of the amplifier 128 is provided to a digital meter 130 that provides a numerical reading that may be correlated to the temperature being measured by the temperature sensor 86. The digital meter 130 may be implemented using a part number DMS-30PC commercially available from Datel of Mansfield, Mass. Normally, the amplifier 128 has a gain adjustment which may be used to calibrate a meter reading with a specific temperature. Further, the amplifier 128 has a second output 132 that is connected to a LED indicator 134. The amplifier 128 provides a signal on output 132 illuminating the LED indicator 134 when the amplifier 128 detects that the temperature sensor 86 is an open circuit and not functioning.

In a similar manner, the temperature sensor 84 has an output 135 connected to a control interface 136 that in turn has an output 137 connected to an amplifier 138. The amplifier 138 has a first output 139 connected to a digital meter 140 and a second output 141 connected to a "probe open" LED indicator 142. The digital meter 140 and LED indicator 142 are identical to the digital meter 130 and indicator 134 previously described.

In use during normal operation, there is a first PID control loop between the temperature sensor 86 of the cold tank 74 and the RU control 34 (FIG. 1). The control 34 continuously monitors the temperature of the cold tank 74 using the temperature sensor 86. In a known manner, the control 34 cycles the compressor 80 ON and OFF as the temperature measured by the temperature sensor 86 varies with respect to a selectable temperature set point, thereby maintaining the temperature of the cooling fluid in the cold tank at the set point temperature.

The control 34 also has a second PID control loop in which the heater 64 and the cold valve 72 are operated in response to a difference in temperature between the temperature sensor 42 (FIG. 1) and a set point temperature for the acid bath. If the acid bath becomes too cool, the control 34 operates the heater 64 to warm the heat exchange fluid in the reservoir 60. If the acid bath becomes too hot, the control 34 proportionally operates the valve 72 to circulate some of the heat exchange fluid through the cold tank 74. The temperature sensor 84 measures the temperature of the heat exchange fluid entering the RU heat exchanger 28 (FIG. 1).

If, for some reason, the acid in the sink 22 (FIG. 1) rises in temperature above an upper temperature limit which is detected by the temperature sensor 42; and the control 34 is unable to cool the acid, the control 34 provides an error signal which is monitored by an operator. In attempt to remedy the situation, the diagnostician does not know whether the error condition is the fault of the control 34 at the first location or, the devices at the separate location. To isolate the devices, the control 34 is disconnected from the recirculation unit 24 by removing the connector 38 and connecting the connector 54 of the test fixture 50. The diagnostician is then able to activate the compressor switch 104 to turn ON the compressor 80 and monitor the temperature of the cold tank 74 using the meter 130 which displays an output from the temperature sensor 86. Similarly, the diagnostician is able to check the operation of the heater 64 by actuating the heater switch 98 and pump switch 100 to recirculate the fluid and use the meter 140 to monitor the temperature of the fluid as measured by the temperature sensor 84.

Thus, the test fixture 50 has the advantage of being able to isolate the operation of the devices within the recirculation unit 24 from the control 34. Further, the test fixture 50 permits the diagnostician to selectively operate devices within the recirculation unit so that their individual functions may be checked. Further, the processes being performed by the recirculation unit 24, for example, maintaining the temperature of the cold tank at a desired set point, and the heating of a fluid within the recirculation tank 60 may be easily and reliably tested.

While the invention has been set forth by a description of the preferred embodiment in considerable detail, it is not intended to restrict or in any way limit the claims to such detail. Additional advantages and modifications will readily appear to those who are skilled in the art. For example, preferably the heater switch 98 is implemented using a push button switch. The push button switch is preferred to prevent the heater from being switched ON for an undesirable length of time. Alternatively, the heater switch 98 may be implemented using a toggle switch that activates a timer that is set to time out after an interval normally required to check the operation of the heater 64.

While the LED indicators 134, 142 are visually perceptible indicators, the indicators may alternatively be aurally perceptible indicators, for example, a buzzer or tone device mounted to the test fixture. The invention, therefore, in its broadest aspects, is not limited to the specific details shown and described. Consequently, departures may be made from the details described herein without departing from the spirit and scope of the claims which follow:

What is claimed is:

1. A recirculation unit test fixture for testing the operation of a recirculation unit installed in a first room, the recirculation unit having components operably connected to an associated heat exchanger installed in a separate second room and the components collectively having electrical inputs and outputs connected to a control in the second room, the recirculation unit further having a first temperature sensor for detecting a first temperature of a fluid flowing in the recirculation unit, the recirculation unit test fixture comprising:

a housing in the first room;

a plurality of output conductors extending from the housing, first ends of selected ones of the plurality of output conductors being connectable to selected ones of the inputs and outputs of the components of the recirculation unit;

a power supply mounted to the housing;

a plurality of switches mounted to the housing, each of the plurality of switches having one contact connected to the power supply and another contact connected to a second end of one of the plurality of output conductors, whereby actuating one of the switches causes one of the components of the recirculation unit to operate;

an indicator mounted to the housing; and an amplifier mounted to the housing and having an input connectable to an output of the first temperature sensor and outputs connectable to the indicator, the amplifier providing a first output signal as a function of the temperature detected by the first temperature sensor, and a second output signal in response to the amplifier detecting an open circuit condition with respect to the first temperature sensor.

2. The recirculation unit test fixture of claim 1 wherein the components in the first room are wired to a first connector, and the recirculation unit control in the second room has a cable terminated with a second connector connectable to the first connector, and the test fixture further comprises a third connector connectable to the first connector, the third connector being attached to the first ends of the plurality of conductors.

3. The recirculation unit test fixture of claim 1 wherein one of the switches is a single-pole, double-throw switch.

4. The recirculation unit test fixture of claim 1 wherein one of the switches is a pushbutton switch.

5. The recirculation unit test fixture of claim 1 wherein one of the components is a heater and the push button switch is operably connected to the heater.

6. The test fixture of claim 1 wherein the indicator is a meter.

7. The recirculation unit test fixture of claim 1 wherein one of the components is a second temperature sensor and the recirculation unit test fixture further comprises a second indicator selectively connectable to the second temperature sensor.

8. The recirculation unit test fixture of claim 7 further comprising
- a second amplifier mounted to the housing and having an input connectable to an output of the second temperature sensor, the second amplifier providing a first output signal as a function of the temperature detected by the second temperature sensor; and
- a meter mounted to the housing and connected to the second amplifier for providing a meter reading as a function of the first output signal from the second amplifier.

9. The test fixture of claim 8 wherein the second amplifier provides a second output signal in response to the second amplifier detecting an open circuit condition with respect to the second temperature sensor and the recirculating unit test fixture further comprises an indicator mounted to the housing and being activated in response to the second output signal from the second amplifier.

10. A method of diagnosing a fault in the operation of a recirculation unit having components including a temperature sensor installed at a first location to detect a temperature of a fluid in the recirculation unit, the components being operably connected to an associated heat exchanger installed at a separate second location, and the components collectively having electrical inputs and outputs attached to a first connector, a recirculation unit control having a second connector connected to the first connector for connecting the inputs and outputs to the control, the method comprising:
- providing a recirculation unit test fixture at the first location having a plurality of output conductors at the first location, first ends of selected ones of the plurality of output conductors being connectable to a third connector,
- a power supply mounted to the test fixture,
- a plurality of switches mounted to the test fixture, each of the plurality of switches having one contact connected to the power supply and another contact connected to a second end of respective one of the plurality of output conductors, and
- an indicator mounted to the test fixture and connectable to one of the components;

disconnecting the first and second connectors to disconnect the components from the control;

connecting the first and third connectors to connect the one of the components to the test fixture;

selectively actuating the switches to operate the one of the components; and sensing a fault in the temperature sensor with the indicator.

11. The method of claim 10 further comprising using the indicator to detect an open circuit in the temperature sensor.

12. An apparatus comprising:

first and second separate rooms;

a heat exchanger located in the first room;

a recirculation unit control located in the first room;

a recirculation unit located in the second room and having components operably connected to the heat exchanger, the components collectively having electrical inputs and outputs connectable to the recirculation control;

a test fixture housing in the second room, the test fixture having a plurality of output conductors with first ends of selected ones of the plurality of output conductors connectable to selected ones of the inputs and outputs of the components of the recirculation unit;

a power supply mounted to the test fixture housing; and a plurality of switches mounted to the test fixture housing, each of the plurality of switches having one contact connected to the power supply and another contact connected to a second end of respective one of the plurality of output conductors, whereby actuating one of the switches causes a respective one of the components of the recirculation unit to operate.

* * * * *